US009321265B2

(12) United States Patent
Nystrom et al.

(10) Patent No.: US 9,321,265 B2
(45) Date of Patent: Apr. 26, 2016

(54) ELECTROSTATIC ACTUATOR WITH SHORT CIRCUIT PROTECTION AND PROCESS

(71) Applicant: XEROX CORPORATION, Norwalk, CT (US)

(72) Inventors: Peter J. Nystrom, Webster, NY (US); Mark A. Cellura, Webster, NY (US); Gary D. Redding, Victor, NY (US); Peter M. Gulvin, Webster, NY (US)

(73) Assignee: XEROX CORPORATION, Norwalk, CT (US)

( * ) Notice: Subject to any disclaimer, the term of this patent is extended or adjusted under 35 U.S.C. 154(b) by 142 days.

(21) Appl. No.: 14/193,631

(22) Filed: Feb. 28, 2014

(65) Prior Publication Data

US 2015/0246539 A1 Sep. 3, 2015

(51) Int. Cl.

| | |
|---|---|
| ***B41J 2/41*** | (2006.01) |
| ***G11B 3/00*** | (2006.01) |
| ***B41J 2/14*** | (2006.01) |
| ***B41J 2/16*** | (2006.01) |

(52) U.S. Cl.

CPC ................ *B41J 2/14314* (2013.01); *B41J 2/16* (2013.01); *B41J 2/1628* (2013.01); *B41J 2/1629* (2013.01); *B41J 2/1631* (2013.01); *B41J 2/1634* (2013.01); *B41J 2/1642* (2013.01); *B41J 2/1646* (2013.01); *B41J 2002/14491* (2013.01)

(58) Field of Classification Search

None

See application file for complete search history.

(56) References Cited

U.S. PATENT DOCUMENTS

| | | | | |
|---|---|---|---|---|
| 8,746,850 | B2 * | 6/2014 | Gerner | B41J 2/14314 29/890.1 |
| 2007/0279457 | A1 * | 12/2007 | Nystrom | B41J 2/14 347/55 |
| 2009/0160584 | A1 * | 6/2009 | Premerlani | H01H 59/0009 333/262 |

* cited by examiner

*Primary Examiner* — Erica Lin

(74) *Attorney, Agent, or Firm* — MH2 Technology Law Group LLP

(57) ABSTRACT

An electrostatic actuator for a printhead. The electrostatic actuator may include a substrate. A dielectric layer may be disposed on the substrate. An electrode layer may be disposed on the dielectric layer. A first standoff layer may be disposed at least partially on the electrode layer. A second standoff layer may be disposed at least partially on the electrode layer and at least partially on the first standoff layer. A portion of the second standoff layer disposed on the electrode layer may be removed to form one or more landing pads. A membrane may be disposed at least partially on the second standoff layer.

20 Claims, 8 Drawing Sheets

ELECTROSTATIC ACTUATOR WITH SHORT CIRCUIT PROTECTION AND PROCESS

TECHNICAL FIELD

The present teachings relate to the field of ink jet printing devices and, more particularly, to methods and structures for electrostatically actuated ink jet printheads and a printer including an electrostatically actuated ink jet printhead.

BACKGROUND

Drop on demand ink jet technology is widely used in the printing industry. Printers using drop on demand ink jet technology may use a plurality of electrostatic actuators, piezoelectric actuators, or thermal actuators to eject ink from a plurality of nozzles in an aperture plate. In electrostatic ejection, each electrostatic actuator, which is formed on a substrate assembly, typically includes a flexible diaphragm or membrane, an ink chamber between the aperture plate and the membrane, and an air chamber between the actuator membrane and the substrate assembly. The electrostatic actuator may further include an actuator electrode formed on the substrate assembly. When a voltage is applied to activate the actuator electrode, the membrane is drawn toward the electrode by an electric field and actuates from a relaxed state to a flexed state, which increases a volume of the ink chamber and draws ink into the ink chamber from an ink supply or reservoir. When the voltage is removed to deactivate the actuator electrode, the membrane relaxes, the volume within the ink chamber decreases, and ink is ejected from the nozzle in the aperture plate.

The membrane may occasionally be drawn too far toward the electrode when, for example, the voltage applied is too great, or the voltage is applied for too long. This may cause the membrane to suddenly deform, and the membrane may contact the electrode resulting in a short. This is referred to as a "pull down." When the membrane contacts the electrode, a small discharge can cause an arc or plasma that vaporizes metal locally leading to undesirable behavior. A low ohmic contact may result in a large current that causes similar damage to arcing, but may also lead to trace failure or ASIC damage.

An electrostatically actuator for an ink jet printhead that overcomes problems associated with pull downs would be desirable.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

An electrostatic actuator for a printhead is disclosed. The electrostatic actuator may include a substrate. A dielectric layer may be disposed on the substrate. An electrode layer may be disposed on the dielectric layer. A first standoff layer may be disposed at least partially on the electrode layer. A second standoff layer may be disposed at least partially on the electrode layer and at least partially on the first standoff layer. A portion of the second standoff layer disposed on the electrode layer may be removed to form one or more landing pads. A membrane may be disposed at least partially on the second standoff layer.

A printer is also disclosed. The printer may include a housing and a printhead disposed within the housing. A plurality of electrostatic actuators may be disposed within the printhead. Each electrostatic actuator may include a substrate, a dielectric layer, an electrode layer, first and second standoff layers, an adhesive layer, and a membrane. The dielectric layer may be disposed on the substrate, and the dielectric layer may be or include an oxide, a nitride, or a combination thereof. The electrode layer may be disposed on the dielectric layer, and the electrode layer may be or include a metal. The first standoff layer may be disposed at least partially on the electrode layer. The second standoff layer may be disposed at least partially on the electrode layer and at least partially on the first standoff layer. The first standoff layer, the second standoff layer, or both may be or include an oxide, a nitride, a polymer, or a combination thereof. A portion of the second standoff layer disposed on the electrode layer may be removed to form one or more landing pads. The adhesive layer may be disposed at least partially on the second standoff layer. The membrane may be disposed at least partially on the adhesive layer. A distance between an outer surface of the electrode layer and an inner surface of the membrane may be from about 0.01 μm to about 3 μm when the membrane is in a relaxed state, and a distance between an outer surface of one of the landing pads and the inner surface of the membrane may be from about 0.1 μm to about 2 μm when the membrane is in the relaxed state.

A method for forming an electrostatic actuator for a printhead is also disclosed. The method may include depositing a dielectric layer on a substrate. An electrode layer may be deposited on the dielectric layer. A first standoff layer may be deposited at least partially on the electrode layer. A second standoff layer may be deposited at least partially on the electrode layer and at least partially on the first standoff layer. A portion of the second standoff layer may be removed from the electrode layer to form one or more landing pads on the electrode layer. An adhesive layer may be applied on at least a portion of the second standoff layer. An electrically-conductive membrane may be adhered to the adhesive layer.

BRIEF DESCRIPTION OF THE DRAWINGS

The accompanying drawings, which are incorporated in and constitute a part of this specification, illustrate embodiments of the present teachings and together with the description, serve to explain the principles of the disclosure. In the figures.

It should be noted that some details of the figures have been simplified and are drawn to facilitate understanding of the present teachings rather than to maintain strict structural accuracy, detail, and scale.

DETAILED DESCRIPTION

Reference will now be made in detail to exemplary embodiments of the present teachings, examples of which are illustrated in the accompanying drawings. Wherever possible, the same reference numbers will be used throughout the drawings to refer to the same, similar, or like parts.

As used herein, unless otherwise specified, the word “printer” encompasses any apparatus that performs a print outputting function for any purpose, such as a digital copier, bookmaking machine, facsimile machine, a multi-function machine, electrostatographic device, etc.

An embodiment of the present teachings may result in an electrostatic actuator having an improved structure to reduce the likelihood of (or prevent) an actuator membrane from contacting an electrode layer, which would cause a short. The process and structure can include one or more landing pads disposed between the actuator membrane and the electrode layer to provide a buffer therebetween.

Figure 1:
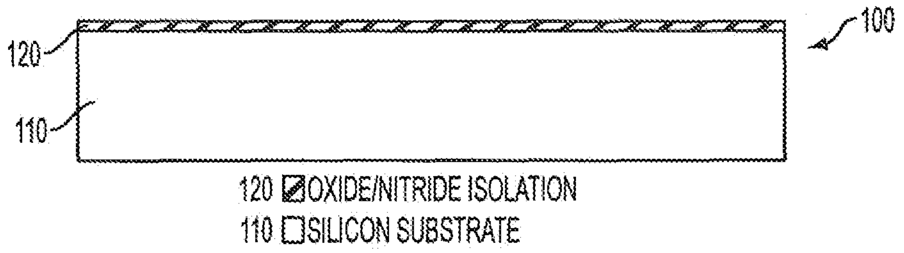
FIG. 1 depicts a partial side cross-sectional view of an illustrative electrostatic actuator having a dielectric layer deposited on a substrate, according to one or more embodiments disclosed.

A process for forming an electrostatic actuator is depicted in FIGS. 1-11. It will be understood that the structures depicted in the figures may include additional features not depicted for simplicity, while depicted structures may be removed or modified. FIG. 1 depicts a partial side cross-sectional view of the electrostatic actuator 100 having a support or dielectric layer 120 deposited or disposed on a substrate 110, according to one or more embodiments disclosed. The substrate 110 may be or include silicon (e.g., a silicon wafer), glass, quartz, or combination thereof. The substrate 110 may further include various other layers (not depicted for simplicity) such as various doped regions and/or one or more layers such as an oxide layer on which the dielectric layer 120 is disposed.

The dielectric layer 120 may be deposited on the substrate 110 by chemical vapor deposition (e.g., plasma-enhanced chemical vapor deposition). The dielectric layer 120 may be made from an oxide and/or nitride such as silicon nitride or oxynitride and have a thickness from about 0.01 μm to about 1.0 μm, about 0.1 μm to about 0.8 μm, or about 0.2 μm to about 0.6 μm.

Figure 2:
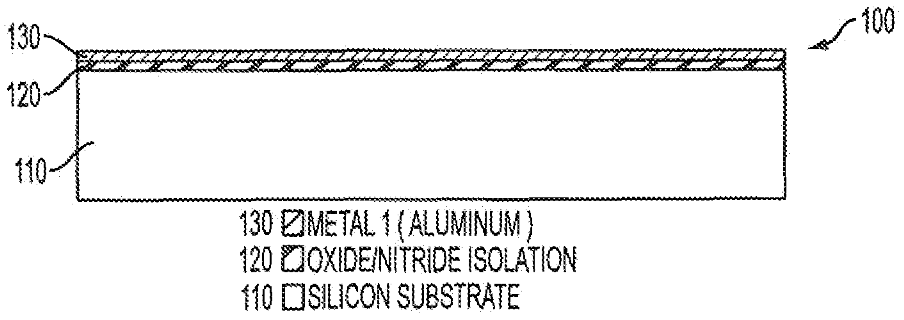
FIG. 2 depicts a partial side cross-sectional view of the electrostatic actuator having an electrode layer deposited on the dielectric layer shown in FIG. 1, according to one or more embodiments disclosed.

FIG. 2 depicts a partial side cross-sectional view of the electrostatic actuator 100 having a conductive or electrode layer 130 deposited or disposed on the dielectric layer 120 shown in FIG. 1, according to one or more embodiments disclosed. The electrode layer 130 may be deposited by RF sputtering. The electrode layer 130 may be made from a metal such as aluminum, chromium, nickel, copper, gold, titanium tungsten (TiW), indium tin oxide (ITO), or any other metal. The electrode layer 130 may also include a doped polysilicon. The electrode layer 130 may have a thickness from about 0.05 μm to about 1.2 μm, about 0.2 μm to about 0.6 μm, or about 0.3 μm to about 0.5 μm.

Figure 3:
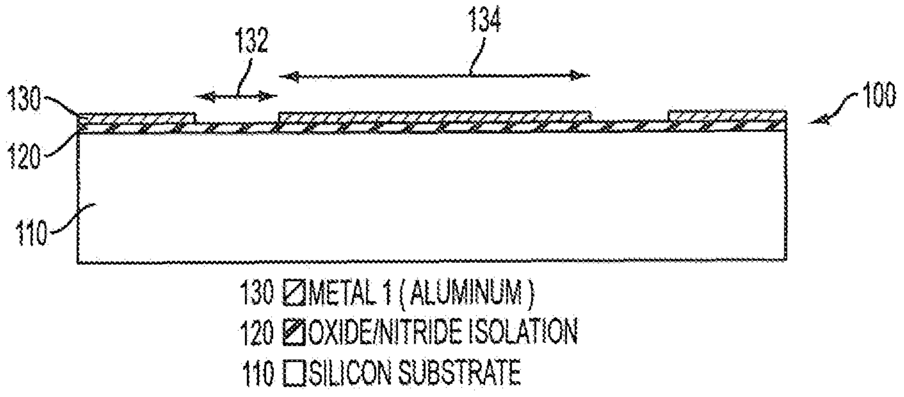
FIG. 3 depicts a partial side cross-sectional view of the electrostatic actuator having one or more portions of the electrode layer (shown in FIG. 2) removed, according to one or more embodiments disclosed.

FIG. 3 depicts a partial side cross-sectional view of the electrostatic actuator 100 having one or more portions of the electrode layer 130 (shown in FIG. 2) removed, according to one or more embodiments disclosed. Once the electrode layer 130 is deposited, one or more portions 132 of the electrode layer 130 may be removed (e.g., etched away) forming one or more wires and/or electrodes 134. This may be referred to as a patterned electrode layer 130. The etching may be a dry RIE etch, which is anisotropic to resolve the fine lines.

Figure 4:
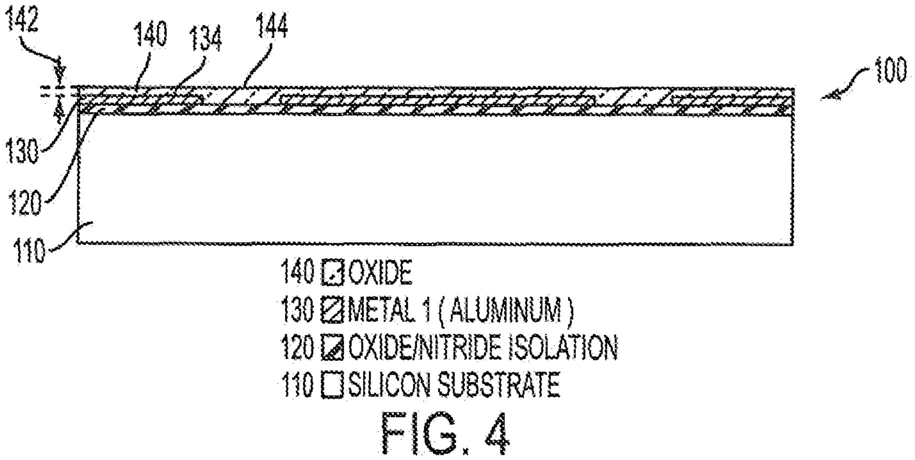
FIG. 4 depicts a partial side cross-sectional view of the electrostatic actuator having a first standoff layer deposited at least partially on the electrode layer shown in FIG. 3, according to one or more embodiments disclosed.

FIG. 4 depicts a partial side cross-sectional view of the electrostatic actuator 100 having a first standoff layer 140 deposited or disposed on the electrode layer 130 shown in FIG. 3, according to one or more embodiments disclosed. The first standoff layer 140 may be deposited by chemical vapor deposition (e.g., plasma-enhanced chemical vapor deposition). The first standoff layer 140 may be or include an oxide. More particularly, the first standoff layer 140 may be or include an oxide or dielectric. For example, the first standoff layer 140 may be or include an oxynitride, a nitride, tetraethyl orthosilicate, or a polymer such as benzocyclobutene (BCB) or SUB. As shown in FIG. 4, in addition to being deposited on the electrode layer 130, the first standoff layer 140 may also be deposited on portions of the dielectric layer 120 where the electrode layer 130 has been etched away.

A height or thickness 142 of the first standoff layer 140 may be from about 0.01 μm to about 2 μm, about 0.1 μm to about 1 μm, about 0.3 μm to about 0.7 μm. The thickness 142 may be measured from the outer surface 134 of the electrode layer 130 to the outer surface 144 of the first standoff layer 140.

Figure 5:
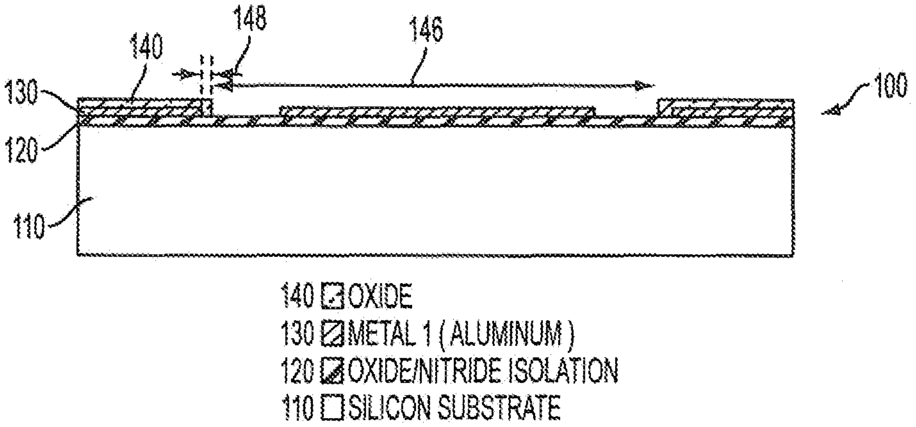
FIG. 5 depicts a partial side cross-sectional view of the electrostatic actuator having one or more portions of the first standoff layer (shown in FIG. 4) removed, according to one or more embodiments disclosed.

FIG. 5 depicts a partial side cross-sectional view of the electrostatic actuator 100 having one or more portions of the first standoff layer 140 removed, according to one or more embodiments disclosed. Once the first standoff layer 140 is deposited, one or more portions 146 of the first standoff layer 140 may be removed (e.g., etched away). The etching may expose (i.e., uncover) at least one of the wires and/or electrodes 134 of the electrode layer 130. As shown in FIG. 5, the middle of the three wires and/or electrodes 134 is exposed. As may be appreciated, the number of wires and/or electrodes 134 shown is for illustrative purposes, and more or fewer wires and/or electrodes 134 may be present. The etching may also expose at least a portion of the dielectric layer 120 between adjacent wires and/or electrodes 134.

A width 148 of the first standoff layer 140 extending laterally beyond the electrode layer 130 and/or in contact with the dielectric layer 120 may be from about 0.01 μm to about 1 μm, about 0.2 μm to about 0.8 μm, or about 0.35 μm to about 65 μm.

Figure 6:
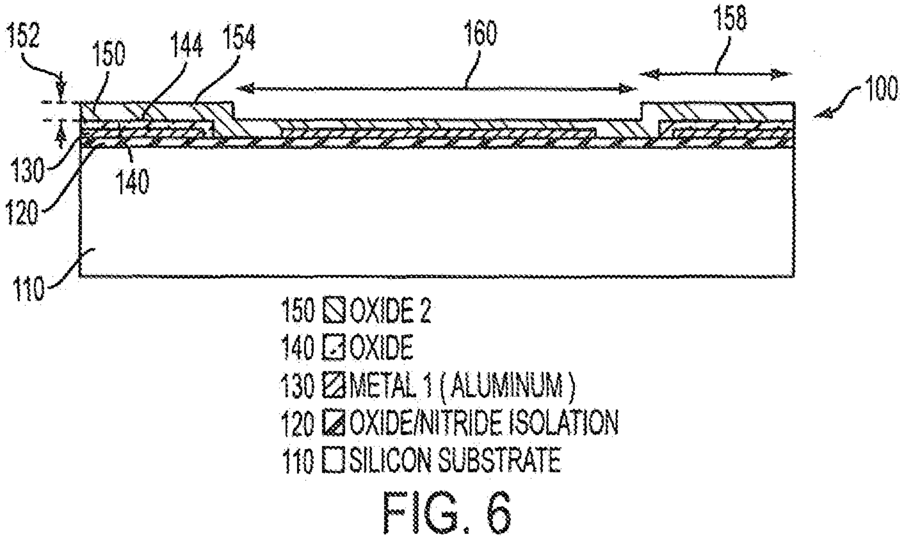
FIG. 6 depicts a partial side cross-sectional view of the electrostatic actuator having a second standoff layer deposited at least partially on the first standoff layer shown in FIG. 5, according to one or more embodiments disclosed.

FIG. 6 depicts a partial side cross-sectional view of the electrostatic actuator 100 having a second standoff layer 150 deposited or disposed on the first standoff layer 140 shown in FIG. 5, according to one or more embodiments disclosed. The second standoff layer 150 may be deposited by chemical vapor deposition (e.g., plasma-enhanced chemical vapor deposition). The second standoff layer 150 may be or include an oxide or dielectric. For example, the second standoff layer 150 may be or include an oxynitride, a nitride, tetraethyl orthosilicate, or a polymer such as benzocyclobutene (BCB) or SUB. As shown in FIG. 6, in addition to being deposited on the first standoff layer 140, the second standoff layer 150 may also be deposited (1) on portions of the dielectric layer 120 where the electrode layer 130 and the first standoff layer 140 have been etched away and (2) on portions of the electrode layer 130 where the first standoff layer 140 has been etched away.

A height or thickness 152 of the second standoff layer 150 may be from about 0.01 μm to about 1 μm, about 0.1 μm to about 0.8 μm, or about 0.35 μm to about 0.65 μm. The thickness 152 may be measured from the outer surface 144 of the first standoff layer 140 to the outer surface 154 of the second standoff layer 150.

The second standoff layer 150 may be “stepped.” In other words, one or more portions 158 of the outer surface 154 of the second standoff layer 150 may be positioned farther away from the substrate 110, the dielectric layer 120, and/or the electrode layer 130 than one or more other portions 160 of the outer surface 154 of the second standoff layer 150. These portions 158 may be referred to as “membrane bond pads” because they may contact and support a membrane 180, as described in greater detail below with reference to FIG. 9.

Figure 7:
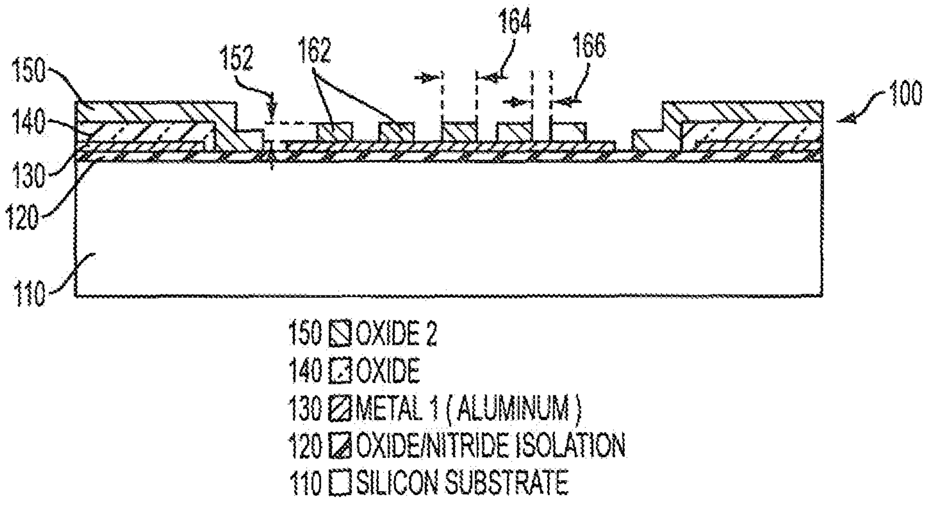
FIG. 7 depicts a partial side cross-sectional view of the electrostatic actuator having one or more portions of the second standoff layer (shown in FIG. 5) removed, according to one or more embodiments disclosed.

FIG. 7 depicts a partial side cross-sectional view of the electrostatic actuator 100 having one or more portions of the second standoff layer 150 removed, according to one or more embodiments disclosed. Once the second standoff layer 150 is deposited, one or more portions of the second standoff layer 150 may be removed (e.g., etched away). The etching may expose one or more portions of the wires and/or electrodes 134 (e.g., the middle wire and/or electrode) of the electrode layer 130. The etching may also expose at least a portion of the dielectric layer 120 between adjacent wires and/or electrodes 134.

The etching of the second standoff layer 150 may form one or more landing posts or pads (five are shown 162). The landing pads 162 may be disposed on the electrode layer 130. The thickness 152 of the landing pads 162 may be the same as or similar to the thickness of the second standoff layer 150.

An average width 164 of each of the landing pads 162 may be from about 1 μm to about 100 μm, about 5 μm to about 50 μm, or about 10 μm to about 30 μm. The width 164 may be small enough so as to not add too much dielectric material to the gap region, but large enough so that the landing pads 162 are robust to withstand possible physical contact and to resolve during the litho/etch processes.

The distances 166 between adjacent landing pads 162 may be the same, or the distances may vary. An average distance 166 between two adjacent landing pads 162 in the same row (see FIG. 12) may be from about 20 μm to about 500 μm, about 50 μm to about 250 μm, or about 75 μm to about 150 μm. This distance 166 may be tight enough to provide adequate support, but not so dense as to dominate the whole space. In at least one embodiment, the density may be higher in the center region and less dense near the boundaries.

Figure 8:
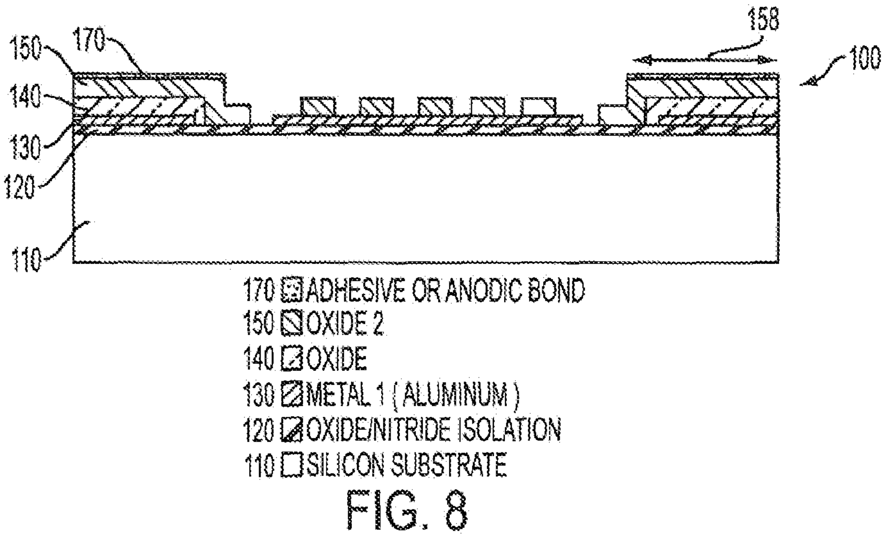
FIG. 8 depicts a partial side cross-sectional view of the electrostatic actuator having an adhesive or other bond layer applied to the second standoff layer shown in FIG. 7, according to one or more embodiments disclosed.

FIG. 8 depicts a partial side cross-sectional view of the electrostatic actuator 100 having an adhesive or other bond layer 170 applied to a portion of the second standoff layer 150, according to one or more embodiments disclosed. As shown, the adhesive layer 170 may be applied to the membrane bond pads 158 (of the second standoff layer 150) and not applied to the landing pads 162 (of the second standoff layer 150).

The adhesive layer 170 may be made from Resin Designs 12300 resin, Epon® resin 1001F, or any adhesive that may be applied thin enough and in a controlled fashion. A height or thickness of the adhesive layer 170 may be from about 0.01 μm to about 0.2 μm, about 0.02 μm to about 0.15 μm, or about 0.05 μm to about 0.1 μm. In at least one embodiment, the adhesive layer 170 may represent a bondline of an anodic bond, a fusion bond, a diffusion bond, a solder bond, a frit bond, or any other wafer bond made without an adhesive.

Figure 9:
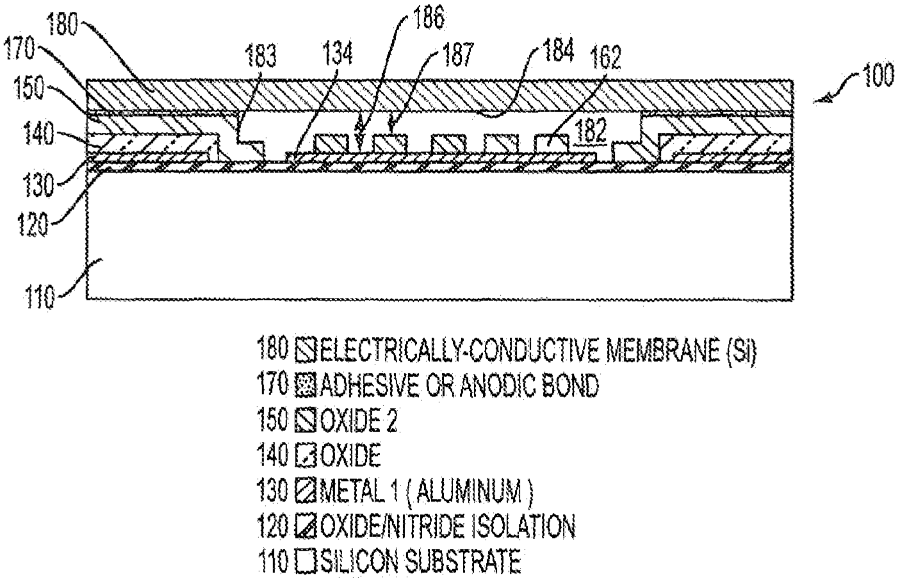
FIG. 9 depicts a partial side cross-sectional view of the electrostatic actuator having a membrane bonded to the adhesive layer shown in FIG. 8, according to one or more embodiments disclosed.

FIG. 9 depicts a partial side cross-sectional view of the electrostatic actuator 100 having a membrane 180 bonded to the adhesive layer 170, according to one or more embodiments disclosed. The bonding of the membrane 180 to the adhesive layer 170 may be substantially alignment-free because the electrostatic actuator 100 may be built on a single substrate 110.

The membrane 180 may be an electrically-conductive membrane. More particularly, the membrane 180 may be or include iron-nickel alloy such as Invar (64FeNi), a doped silicon layer, or another suitable electrically-conductive material, having a thickness from about 1 μm to about 50 μm, about 5 μm to about 40 μm, or about 10 μm to about 25 μm. The membrane 180 may be featureless. In other words, the membrane 180 may be or include a metal foil with an adhesive bond, a silicon membrane with an adhesive bond, or a silicon membrane may be used to form the membrane 180 with anodic bonding. To arrive at this, an operator may bond a thin silicon wafer, bond a thick silicon wafer and grind or lap to a final thickness, or bond an SOI wafer and grind or remove the handle and box layer leaving the final membrane.

An air chamber 182 may be disposed between the membrane 180 and the dielectric layer 120, the electrode layer 130, and the second standoff layer 150. The sidewalls 183 of the chamber 182 may be at least partially defined by the first standoff layer 140 and/or the second standoff layer 150.

As shown in FIG. 9, when the membrane 180 is in a relaxed state (i.e., not bending or deflecting), a distance 186 between the outer surface 134 of the electrode layer 130 and the inner surface 184 of the membrane 180 may be from about 0.01 μm to about 3 μm, about 0.1 μm to about 1.5 μm, or about 0.75 μm to about 1.25 μm. Similarly, when the membrane 180 is in the relaxed state, a distance 187 between the outer surface 164 of the landing pads 162 and the inner surface 184 of the membrane 180 may be from about 0.01 μm to about 2 μm, about 0.2 μm to about 1 μm, or about 0.3 μm to about 0.75 μm. Thus, the distance 186 may be greater than the distance 187.

The membrane 180 may be configured to actuate into a flexed state (by bending or deflecting) when a voltage is applied to the electrode layer 130, which generates an attractive force. In response to the attractive force, the membrane 180 is configured to bend or deflect from about 0.01 μm to about 0.5 μm, about 0.02 μm to about 0.2 μm, or about 0.05 μm to about 0.1 μm to achieve the desired ink drop size and velocity. The landing pads 162 may be configured to prevent the membrane 180 from contacting the electrode layer 130 when the membrane 180 is deflecting, thereby preventing a short from occurring. Further, the landing pads 162 may be thick enough to prevent arcing from occurring when the membrane 180 deflects toward the electrode layer 130.

Figure 10:
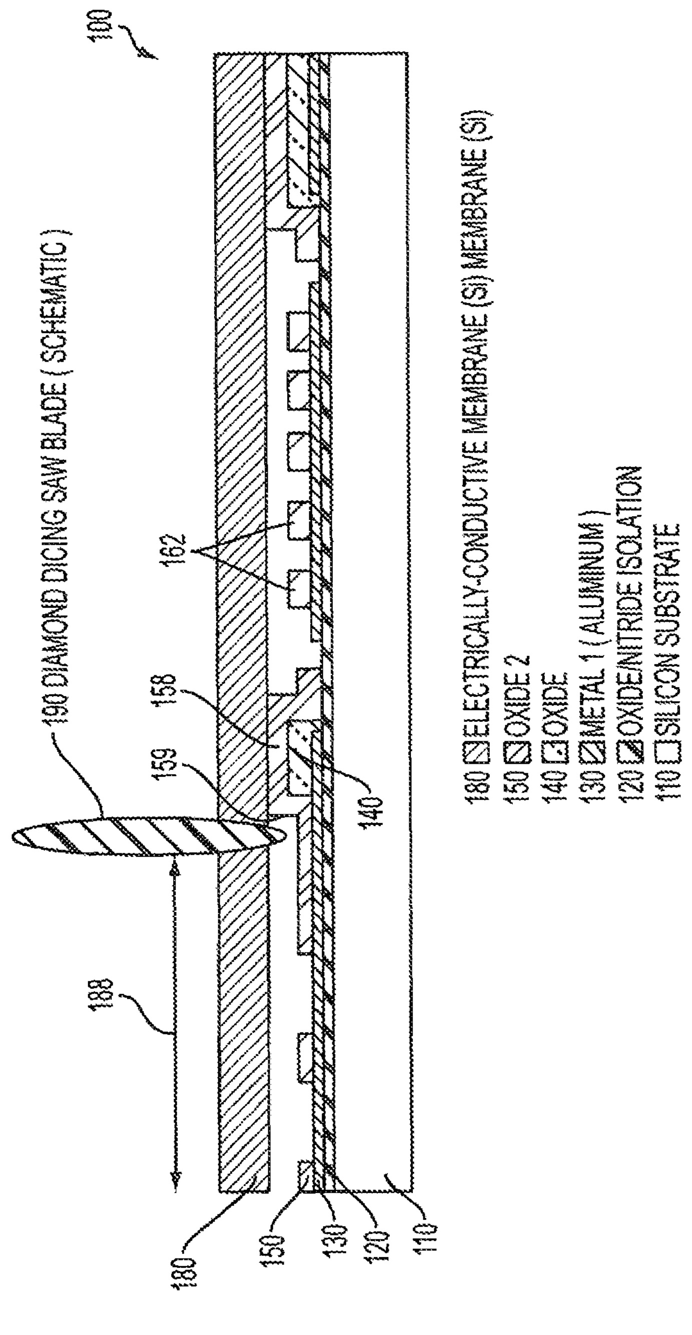
FIG. 10 depicts a partial side cross-sectional view of the electrostatic actuator having a portion of the membrane (shown in FIG. 9) removed, according to one or more embodiments disclosed.

FIG. 10 depicts a partial side cross-sectional view of the electrostatic actuator 100 having a portion of the membrane 180 removed, according to one or more embodiments disclosed. Once the membrane 180 is bonded to the adhesive layer 170, one or more portions 188 of the membrane 180 may be removed. The portion(s) 188 of the membrane 180 may be removed. The portion(s) may be removed by a saw (e.g., a diamond dicing saw blade) 190, by laser or chemical etching, or any other method known in the art. In at least one embodiment, the membrane 180 may be pre-patterned such that subsequent "windowing" is not needed. The saw 190 may cut through the membrane 180 proximate a side 159 of the contact pad 158 farthest from the landing pads 162.

Figure 11:
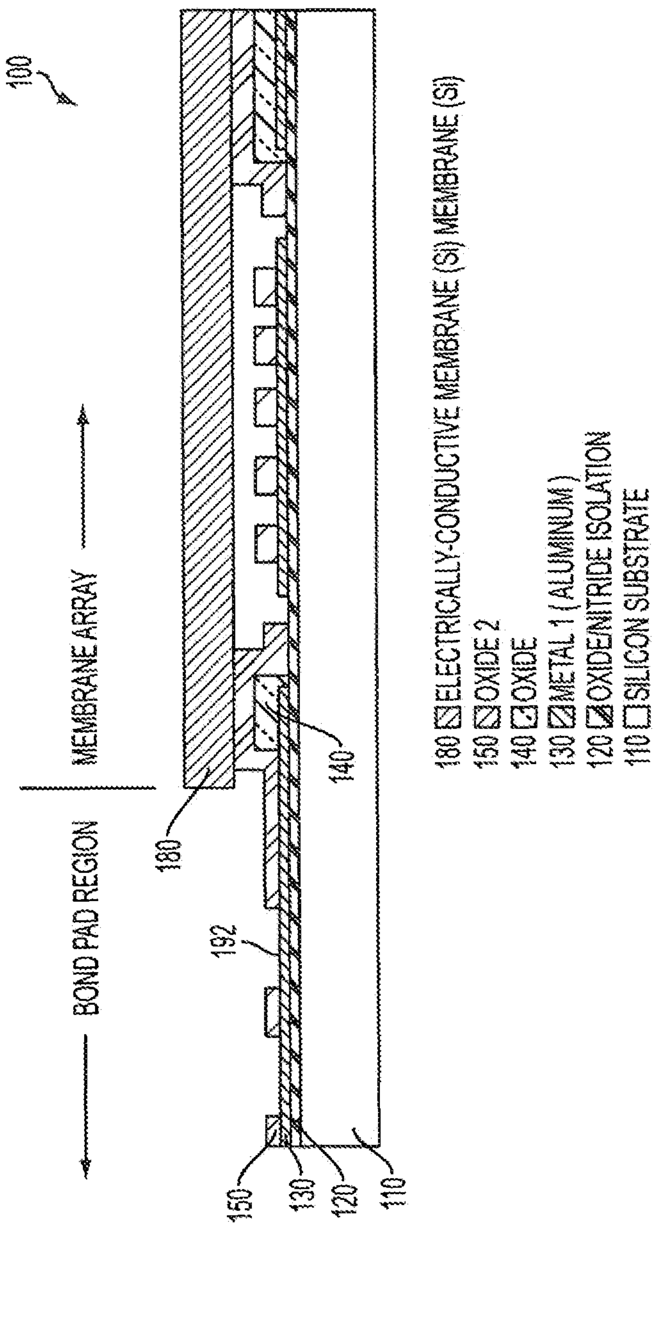
FIG. 11 depicts a partial side cross-sectional view of the electrostatic actuator having one or more bond pads exposed, according to one or more embodiments disclosed.

FIG. 11 depicts a partial side cross-sectional view of the electrostatic actuator 100 having one or more electrical bond pads 192 exposed, according to one or more embodiments disclosed. Once the portion 188 of the membrane 180 is removed, one or more bond pads 192 may be exposed. This allows for the bonding between the membrane 180 and the membrane bond pads 158 (see FIG. 6) to be the only areas that are bonded together. The bond pads 192 may be made of the same material as the electrode layer 130.

Figure 12:
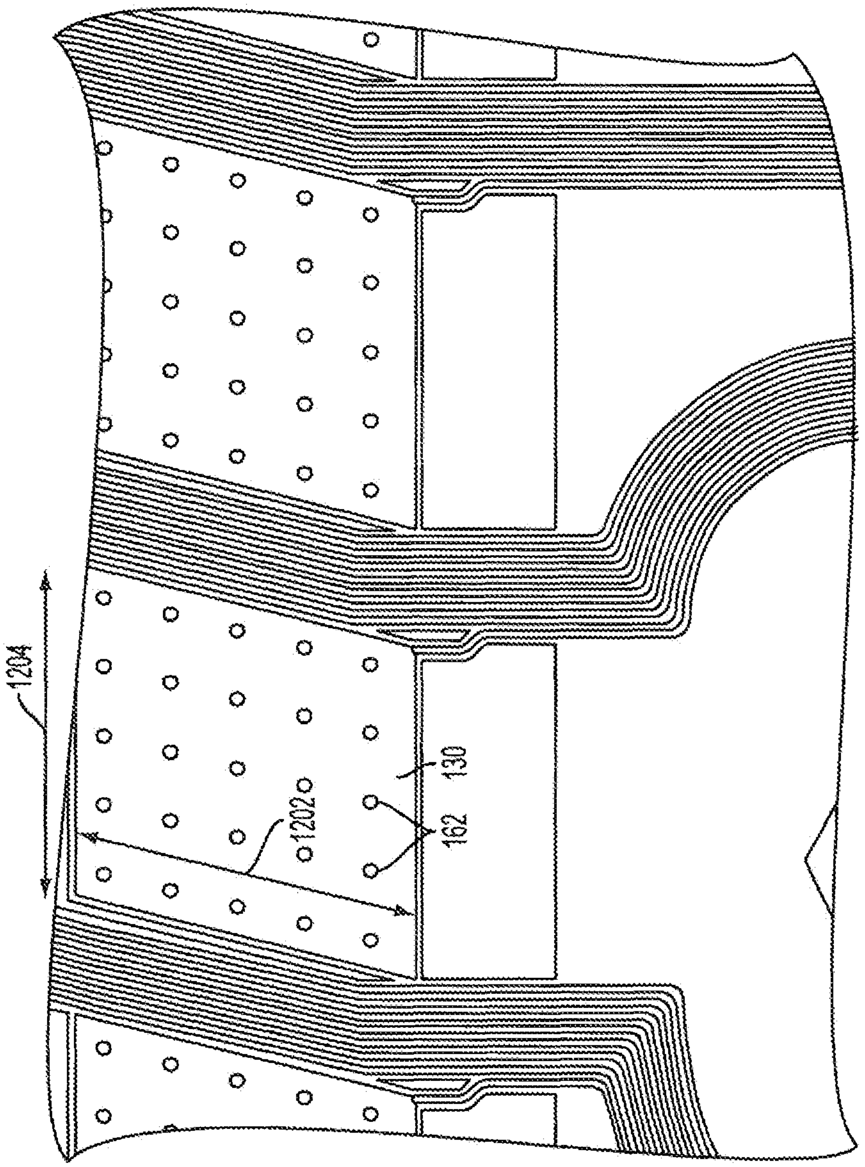
FIG. 12 depicts a partial top view of the electrode layer and the landing pads, according to one or more embodiments disclosed.

FIG. 12 depicts a partial top view of the electrode layer 130 and the landing pads 162, according to one or more embodiments disclosed. As shown, the electrode layer 130 is in the shape of a parallelogram; however, as may be appreciated, the shape may vary. Other illustrative shapes may be or include a rectangle, a square, a triangle, a circle, an oval, combinations thereof, or the like. The length 1202 and/or the width 1204 of the electrode layer 130 may be from about 50 μm to about 5 mm, about 100 μm to about 2 mm, or about 200 μm to about 1 mm. The aspect ratio may be from about 1:1 to about 1:100 or more.

As shown, each section of the electrode layer 130 includes 25 landing pads 162 in five rows of five; however, as may be appreciated, more or fewer landing pads 162 (and/or rows) may be disposed on a single section of the electrode layer 130. As shown, the landing pads 162 have a cross-sectional shape that is circular; however, as may be appreciated, the shape may vary. Other illustrative shapes may be or include a rectangle, a square, a triangle, a circle, an oval, combinations thereof, or the like. In another embodiment, the landing pads 162 in a single row may each be connected forming a single, elongated landing pad.

Figure 13:
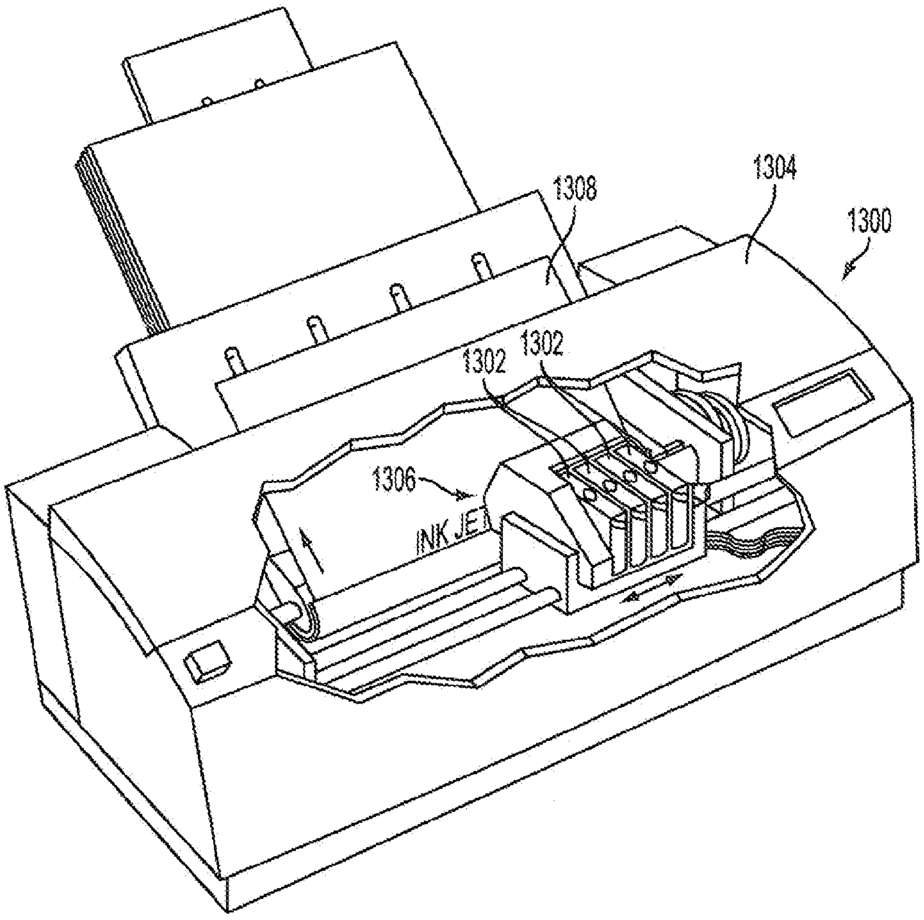
FIG. 13 depicts a perspective view of a printer including a printhead, according to one or more embodiments disclosed.

FIG. 13 depicts a perspective view of a printer 1300 including a printhead 1302, according to one or more embodiments disclosed. The printer 1300 may include a printer housing 1304 into which at least one printhead 1302 may be installed. The printhead 1302 may include one or more electrostatic actuators 100 disposed therein. During operation, voltage pulses to the electrode layer 130 of the electrostatic actuator 100 may cause the membrane 180 to transition from the relaxed state to the flexed state and back again, which in turn causes ink 1306 to be ejected from the printhead 1302. The printhead 1302 may be operated in accordance with digital instructions to create a desired image on a print medium 1308 such as a piece or paper. The printhead 1302 may move back and forth relative to the print medium 1308 in a scanning motion to generate the printed image swath by swath. In another embodiment, the printhead 1302 may be held fixed and the print medium 1308 moved relative to thereto, creating an image as wide as the printhead 1302 in a single pass. The printhead 1302 may be narrower than, or as wide as, the print medium 1308. In another embodiment, the printhead 1302 may print to an intermediate surface such as a rotating drum or belt (not depicted for simplicity) for subsequent transfer to a print medium.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" may include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter may take on negative values. In this case, the example value of range stated as "less than 10" can assume negative values, e.g. −1, −2, −3, −10, −20, −30, etc.

While the present teachings have been illustrated with respect to one or more implementations, alterations and/or modifications may be made to the illustrated examples without departing from the spirit and scope of the appended claims. For example, it may be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It may be appreciated that structural components and/or processing stages may be added, or existing structural components and/or processing stages may be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items may be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. Finally, the terms "exemplary" or "illustrative" indicate the description is used as an example, rather than implying that it is an ideal. Other embodiments of the present teachings may be apparent to those skilled in the art from consideration of the specification and practice of the disclosure herein. It is intended that the specification and examples be considered as exemplary only, with a true scope and spirit of the present teachings being indicated by the following claims.

Terms of relative position as used in this application are defined based on a plane parallel to the conventional plane or working surface of a workpiece, regardless of the orientation of the workpiece. The term "horizontal" or "lateral" as used in this application is defined as a plane parallel to the conventional plane or working surface of a workpiece, regardless of the orientation of the workpiece. The term "vertical" refers to a direction perpendicular to the horizontal. Terms such as "on," "side" (as in "sidewall"), "higher," "lower," "over," "top," and "under" are defined with respect to the conventional plane or working surface being on the top surface of the workpiece, regardless of the orientation of the workpiece.

What is claimed is:

1. An electrostatic actuator for a printhead, comprising:
- a substrate;
- a dielectric layer disposed on the substrate;
- an electrode layer disposed on the dielectric layer;
- a first standoff layer disposed at least partially on the electrode layer;
- a second standoff layer disposed at least partially on the electrode layer and at least partially on the first standoff layer, wherein a portion of the second standoff layer disposed on the electrode layer is removed to form one or more landing pads; and
- a membrane disposed at least partially on the second standoff layer.

2. The printhead of claim 1, wherein the dielectric layer comprises an oxide, a nitride, or a combination thereof.

3. The printhead of claim 1, wherein the electrode layer comprises metal.

4. The printhead of claim 1, wherein the first standoff layer, the second standoff layer, or both comprise an oxide.

5. The printhead of claim 1, wherein a thickness of the first standoff layer is from about 0.01 μm to about 2 μm.

6. The printhead of claim 1, wherein a thickness of the second standoff layer is from about 0.01 μm to about 1 μm.

7. The printhead of claim 1, wherein a distance between an outer surface of the electrode layer and an inner surface of the membrane is from about 0.01 μm to about 3 μm when the membrane is in a relaxed state.

8. The printhead of claim 1, wherein a distance between an outer surface of one of the landing pads and an inner surface of the membrane is from about 0.01 μm to about 2 μm when the membrane is in a relaxed state.

9. The printhead of claim 1, wherein an average width of each of the one or more landing pads is from about 1 μm to about 100 μm.

10. The printhead of claim 1, wherein an average distance between two adjacent landing pads is from about 50 μm to about 250 μm.

11. A printer, comprising:
- a housing; and
- a printhead disposed within the housing, wherein a plurality of electrostatic actuators are disposed within the printhead, and wherein each electrostatic actuator comprises:
  - a substrate;
  - a dielectric layer disposed on the substrate, wherein the dielectric layer comprises an oxide, a nitride, or a combination thereof;
  - an electrode layer disposed on the dielectric layer, wherein the electrode layer comprises a metal;
  - a first standoff layer disposed at least partially on the electrode layer;
  - a second standoff layer disposed at least partially on the electrode layer and at least partially on the first standoff layer, wherein the first standoff layer, the second standoff layer, or both comprise an oxide, a nitride, a polymer, or a combination thereof, and wherein a portion of the second standoff layer disposed on the electrode layer is removed to form one or more landing pads;
  - an adhesive layer disposed at least partially on the second standoff layer; and
  - a membrane disposed at least partially on the adhesive layer, wherein a distance between an outer surface of the electrode layer and an inner surface of the membrane is from about 0.01 μm to about 3 μm when the membrane is in a relaxed state, and wherein a distance between an outer surface of one of the landing pads and the inner surface of the membrane is from about 0.1 μm to about 2 μm when the membrane is in the relaxed state.

12. The printer of claim 11, wherein a thickness of the one or more landing pads is from about 0.01 μm to about 1 μm.

13. The printer of claim 12, wherein an average width of each of the one or more landing pads is from about 1 μm to about 100 μm.

14. The printer of claim 13, wherein an average distance between two adjacent landing pads is from about 50 μm to about 250 μm.

15. The printer of claim 14, wherein the first standoff layer and the second standoff layer are each at least partially disposed on the dielectric layer.

16. A method for forming an electrostatic actuator for a printhead, comprising:
- depositing a dielectric layer on a substrate;
- depositing an electrode layer on the dielectric layer;
- depositing a first standoff layer at least partially on the electrode layer;
- depositing a second standoff layer at least partially on the electrode layer and at least partially on the first standoff layer;
- removing a portion of the second standoff layer from the electrode layer to form one or more landing pads on the electrode layer;
- applying an adhesive layer on at least a portion of the second standoff layer; and
- adhering an electrically-conductive membrane to the adhesive layer.

17. The method of claim 16, further comprising removing a portion of the first standoff layer from the electrode layer.

18. The method of claim 17, wherein removing a portion of the second standoff layer comprises exposing a portion of the electrode layer.

19. The method of claim 18, further comprising removing a portion of the membrane.

20. The method of claim 16, wherein the adhesive layer represents a bondline of an anodic bond.

* * * * *